United States Patent [19]

Schäfer et al.

[11] Patent Number: 6,113,871
[45] Date of Patent: Sep. 5, 2000

[54] CATALYTIC DECOMPOSITION OF AMMONIA AND HYDROGEN CYANIDE IN COKE-OVEN GAS

[75] Inventors: Harald Schäfer, Limburgerhof; Günther Matthias, Frankenthal, both of Germany

[73] Assignee: BASF Aktiengesellschaft, Ludwigshafen, Germany

[21] Appl. No.: 09/221,123

[22] Filed: Dec. 28, 1998

[30] Foreign Application Priority Data

Jan. 8, 1998 [DE] Germany ............... 198 00 449

[51] Int. Cl.$^7$ ............... B01J 8/00; B01J 23/00; B01J 23/58; C01B 21/00; C01C 3/00
[52] U.S. Cl. ............... 423/239.1; 423/235; 423/236; 423/237; 502/325; 502/328; 502/337; 502/340
[58] Field of Search ............... 423/235, 236, 423/237, 239.1; 502/325, 326, 328, 337, 340

[56] References Cited

U.S. PATENT DOCUMENTS

| 4,514,375 | 4/1985 | Laufhiitte | 423/573 |
| 4,992,408 | 2/1991 | Jackson | 502/328 |
| 5,705,136 | 1/1998 | Drago et al. | 423/239.1 |

FOREIGN PATENT DOCUMENTS

| 4116362 | 11/1992 | Germany. |
| 53005065 | 7/1976 | Japan. |
| 2198638 | 8/1990 | Japan. |
| 1353751 | 5/1974 | United Kingdom. |

*Primary Examiner*—Steven P. Griffin
*Assistant Examiner*—Maribel Medina
*Attorney, Agent, or Firm*—Keil & Weinkauf

[57] ABSTRACT

A supported metal oxide catalyst for the decomposition of ammonia and hydrogen cyanide in coke-oven gas is free of noble metals and comprises, based on the total catalyst, from 2 to 5.5% by weight of NiO and from 0.5 to 3.5% by weight of CoO on an MgO support. This catalyst is used in a process for the single-stage catalytic decomposition of ammonia and hydrogen cyanide in coke-oven gas before the latter is fed to a Claus desulfurization plant.

12 Claims, No Drawings

CATALYTIC DECOMPOSITION OF AMMONIA AND HYDROGEN CYANIDE IN COKE-OVEN GAS

The invention relates to a supported metal oxide catalyst which is free of noble metals and is used in a process for the single-stage catalytic decomposition of ammonia and hydrogen cyanide in coke-oven gas before the latter is fed to a Claus desulfurization plant.

Coke-oven gases comprise ammonia, hydrocarbons, carbon monoxide, carbon dioxide and hydrogen cyanide and also sulfur compounds. The coke-oven gas can, for example, be passed to a Claus plant for recovery of sulfur. Here, the hydrogen sulfide present in the coke-oven gas can be burnt in the presence of oxygen and a catalyst such as bauxite and converted into sulfur dioxide. The combustion gases are, in general, subsequently cooled and, after the water formed in the reaction has been condensed out, processed to obtain elemental sulfur. However, if ammonium and hydrogen cyanide are not removed from the coke-oven gas before it is introduced into the Claus plant, ammonium sulfide, ammonium carbonate and cyanides can deposit in the tubes of the heat exchangers of the Claus plant on cooling the combustion gases. This frequently impairs the efficiency of the plant so that it has to be shut down for cleaning purposes.

The dissociation of ammonia occurs as a reversal of the synthesis reaction from the elements. With increasing temperature and under atmospheric pressure, the equilibrium lies on the side of $N_2$ and $H_2$, while the synthesis of ammonia is carried out at high pressure and a temperature of about 400° C. To accelerate the reaction, suitable catalysts are used for the dissociation reaction and the synthesis reaction.

A few processes for the catalytic decomposition of ammonia or hydrogen cyanide in waste gases using metal oxide catalysts have been described.

FR-A 2 110 987 describes, for example, a two-stage ammonia dissociation at a pressure of from 50 to 304 bar. The first step of the reaction is carried out at from 450 to 600° C. and a pressure of 140 bar over a catalyst comprising a ceramic ($Al_2O_3$, MgO activated with $K_2O$) and 8% of nickel. After this step, the gas still contains 33% of ammonia ($NH_3$). In the second step, the reaction takes place under comparable conditions but over a catalyst comprising activated α-iron and $Al_2O_3$, CaO and $K_2O$. The gas then still contains 6.8% of $NH_3$.

JP-A 53 005 065 describes the decomposition of hydrogen cyanide (HCN) in waste gas. In a first step, the gas is passed over a metal oxide catalyst which can comprise Al, Ce, Ti, Zr, Mg, Ba, Ca, Na, K, Mo, V, Fe, Cu, Co, Ni, Mn, Ag and La, and HCN is decomposed in the presence of oxygen to form $NH_3$ and CO. In a second step, oxygen may additionally be introduced into the gas and CO is oxidized to $CO_2$ and $NH_3$ is oxidized to $N_2$. The catalyst used for the second step comprises noble metals such as Pt, Pd, Ag or Rh and as base metal a metal which is selected from the group consisting of Mo, V, Fe, Cu, Co, Ni, Mn and W or a complex of a plurality of metals selected from this group. The two-stage decomposition reaction is carried out at from 100 to 600° C. and the HCN content of more than 1000 ppm is reduced to less than 1 ppm.

DE-A 32 09 858 describes a process in which coke-oven gas is first subjected to a water scrub and the gas mixture obtained comprises ammonia and hydrogen sulfide as well as hydrogen cyanide and hydrocarbons. Fuel gas and air are mixed into this gas mixture and it is then passed at from 1000 to 1200° C. over a nickel oxide catalyst. Ammonia is decomposed into nitrogen and hydrogen while the hydrogen sulfide remains and can be passed on to a Claus desulfurization plant for sulfur recovery.

If the coke-oven gas mixture has a very high sulfur content, the catalyst activity of supported metal oxide catalysts containing only NiO in addition to the support material can be reduced. A temperature increase can cause increased volatility of the NiO. These effects can considerably reduce the life and effectiveness of the catalyst.

It is an object of the present invention to provide a supported metal oxide catalyst which is free of noble metals and can be used in a process for the single-stage catalytic decomposition of ammonia and hydrogen cyanide in coke-oven gas before the latter is fed to a Claus desulfurization plant. This metal oxide catalyst should have an increased activity and stability compared to the metal oxide catalysts previously used in these processes.

We have found that this object is achieved by a supported metal oxide catalyst which is free of noble metals and comprises nickel oxide for the decomposition of ammonium and hydrogen cyanide in coke-oven gas. The metal oxide catalyst comprises, based on the total catalyst, from 2 to 5.5% by weight, preferably from 3.5 to 4.5% by weight, of nickel oxide (NiO) and from 0.5 to 3.5% by weight, preferably from 1.5 to 2.5% by weight, of cobalt oxide (CoO) on a magnesium oxide support. The catalyst preferably further comprises from 1 to 5% by weight of iron oxides. Magnesium oxide is preferably present in the catalyst in a proportion of from about 82 to 97.5% by weight.

In particular, the metal oxide catalyst of the present invention is prepared as follows: The magnesium oxide support is prepared from magnesite, a mineral consisting mainly of magnesium carbonate. From 4 to 5% by weight of $SiO_2$, from 1 to 3% by weight of CaO, from 1 to 2% by weight of $Fe_2O_3$ and from 1 to 2% by weight of $Al_2O_3$ may be present as impurities in the magnesite. However, these impurities have no adverse effect on the catalyst activity. The mineral is ignited at about 1400° C., under which conditions $CO_2$ is given off and MgO remains. The MgO obtained forms very strong, thermally stable bodies.

The MgO support is preferably in the form of spheres. To achieve a low pressure drop, these spheres preferably have a diameter of from 14 to 20 mm, particularly preferably from 17 to 18 mm. Compounds of nickel or cobalt which can be readily decomposed thermally are applied to the MgO support, preferably by impregnating the support with a nitrate, carbonate or oxalate solution of the corresponding metal, particularly preferably a metal nitrate solution. For this purpose, for example, from 1 to 20 g of metallic cobalt or nickel are dissolved in concentrated nitric acid at 20–80° C. and converted into $Co(NO_3)_2$ or $Ni(NO_3)_2$. The metal nitrate solutions in nitric acid are mixed with one another in the ratio in which the metal oxides are subsequently to be present in the catalyst. The MgO spheres are impregnated with the metal nitrate solution at from 20 to 30° C. for 1 hour. The solution migrates into the voids of the MgO support which has a porosity of from 0.1 to 0.14 ml/g. After impregnation, excess liquid adhering to the support is preferably allowed to drip off. The MgO support which has been treated in this way is subsequently calcined. For this purpose, the impregnated MgO spheres are first heated for from 30 to 60 minutes, preferably from 35 to 40 minutes, at from 300 to 400° C. and subsequently for the same time at from 600 to 700° C., preferably from 640 to 660° C., in particular at about 650° C.

Impregnation and calcination of the MgO spheres are carried out a number of times in succession, preferably from 3 to 4 times in succession, in order to achieve the desired metal oxide content in the catalyst.

After calcination, the porosity of the MgO support is reduced to from 0.1 to 0.05 ml/g, preferably to 0.06 ml/g, owing to the CoO and NiO molecules introduced into the voids of the support.

The catalyst subsequently has a total metal oxide content, excluding the support, of from 5.5 to 7.8% by weight, preferably from 5.7 to 7.6% by weight, particularly preferably from 6.0 to 7.0% by weight. In particular, the metal oxide content should be 6.5% by weight. The ratio of NiO to CoO is preferably from 66.7% by weight to 33.3% by weight. Deviations are permitted, for example, at 80% by weight of NiO and 20% by weight of CoO or 55% by weight of NiO to 45% by weight of CoO. Based on the total catalyst, the nickel oxide content is preferably from 3.5 to 5.0% by weight, particularly preferably from 3.7 to 5% by weight, and the CoO content is preferably from 1.5 to 2.5% by weight, particularly preferably from 1.8 to 2.5% by weight.

Supported metal oxide catalysts which are free of noble metals and, apart from the support material, contain only NiO can, as described, be poisoned at a relatively high sulfur content. This disadvantage can be avoided by replacing part of the nickel oxide by cobalt oxide. Cobalt oxide is also less volatile at elevated temperatures than nickel oxide, so that the use of CoO enables the life and activity of the catalyst to be increased. Long-term stability of the catalyst is also given by the thermally stable MgO support.

The noble metal-free metal oxide catalyst of the present invention is preferably in the form of spheres. However, the catalyst can also have other shapes, for example cubes, honeycombs, star extrudates or cylinders. The bulk density is from about 1.3 to 1.6 kg/l, preferably from 1.4 to 1.5 kg/l, the internal surface area is less than 5 $m^2/g$, preferably less than 2 $m^2/g$, and the pore volume is less than 0.3 ml/g, preferably from 0.05 to 0.15 ml/g.

The metal oxide catalyst of the present invention can be used in a process for the single-stage catalytic decomposition of ammonia and hydrogen cyanide in coke-oven gas before the latter is fed to a Claus desulfurization plant.

For the single-stage catalytic decomposition of ammonia and hydrogen cyanide, the coke-oven gas is first subjected to a water scrub. The scrubbed gas is subsequently mixed with air and passed via a burner at a volume flow of from 500 to 1000 $m^3/h$ and $m^3$ of catalyst volume over the metal oxide catalyst located in a brick-lined shaft furnace at a reaction temperature of preferably from 1000 to 1400° C., particularly preferably 1100° C., and a reaction pressure of from 1 to 3 bar. The composition of the gas can vary as a function of the coal used or the gasification and scrubbing conditions. In general, $NH_3$ is present in the mixture in a proportion of from 0.1 to 20% by volume, $H_2S$ and other sulfur compounds are present in a proportion of from 1 to 20% by volume and HCN is present in a proportion of from <100 ppm to 1% by volume.

The invention is illustrated by the examples below:

EXAMPLES

Coke-oven gas was subjected to a water scrub. The ammonia content of the aqueous phase was determined using ion exchange chromatography and the hydrogen cyanide content was determined photometrically in accordance with DIN 38405. The composition of the purified gas mixture was determined by gas chromatography.

The compositions of two gas mixtures are shown as Examples 1 and 2 in Table 1 below.

| Gas composition [% by vol.] | Example 1 | Example 2 |
| --- | --- | --- |
| $H_2$ | 4.3 | 0.17 |
| $N_2$ (balance to 100%) | 42 | 47.5 |
| Ar | 0.4 | 0.5 |
| $O_2$ | 0.35 | 0.8 |
| CO | 1.2 | 0.4 |
| $CO_2$ | 7.3 | 6.1 |
| $H_2S$ | 3.9 | 7.1 |
| COS | 0.1 | <0.1 |
| $SO_2$ | 0.4 | <0.1 |
| $CS_2$ | 0.06 | <0.1 |
| S | 0.7 | 0.8 |
| $H_2O$ | 39 | 23 |
| $NH_3$ | 0.6 | 14 |
| HCN | 0.01 | 0.01 |
| NO |  | 0.16 |

Example 1

In a decomposition furnace, the purified gas mixture was brought into contact with the metal oxide catalyst of the present invention at 1100° C., a pressure of 1.24 bar and a volume flow of 640 $m^3/h$ and $m^3$ of catalyst volume. The catalyst used comprised 4% by weight of NiO and 2% by weight of CoO on an MgO support. The bed height of the catalyst was 2000 mm. Inert spheres having a diameter of 50 mm were arranged above and below the catalyst in a bed depth of 200 and 250 mm respectively.

The gas mixture at the reactor outlet had an $NH_3$ content of less than 0.005% by volume and an HCN content of less than 0.001% by volume. Over 99% of the ammonia content of the gas had been removed. The analysis of the gas was carried out by gas chromatography.

Example 2

In a decomposition furnace, the purified gas mixture was brought into contact with the metal oxide catalyst of the present invention at 1100° C., a pressure of 1.65 bar and a volume flow of 770 $m^3/h$ and $m^3$ of catalyst volume. The catalyst used comprised 4% by weight of NiO and 2% by weight of CoO on an MgO support. The bed height of the catalyst was 2150 mm. Inert spheres having a diameter of 50 mm were arranged above and below the catalyst in a bed depth of 300 and 200 mm respectively.

The gas mixture of the composition for Example 2 had an $NH_3$ content after the reaction of less than 0.005% by volume and an HCN content after the reaction of less than 0.001% by volume. The composition of the gas mixture was measured at the reactor outlet. The analysis of the gas was carried out by gas chromatography.

The gases which had been freed of ammonia and hydrogen cyanide were subsequently introduced into a Claus plant for recovery of sulfur. The tubes of the heat exchangers installed downstream of the combustion furnace of the plant had no deposits of ammonium sulfide, ammonium carbonate or cyanide.

We claim:

1. A process for the single-stage catalytic decomposition of ammonia and hydrogen cyanide in coke-oven gas before the latter is fed to a Claus desulfurization plant, which comprises passing the coke-oven gas over a supported metal oxide catalyst which is free of noble metals and comprises, based on the total catalyst, from 2 to 5.5% weight of NiO and from 0.5 to 3.5% by weight of CoO on an MgO support for the decomposition of ammonia and hydrogen cyanide in sulfur-containing coke-oven gas.

2. A process as claimed in claim 1, wherein the catalyst contains from 3.5 to 4.5% by weight of NiO and from 1.5 to 2.5% by weight of CoO.

3. A process as claimed in claim 1, wherein the catalyst contains from 82 to 97.5% by weight of MgO.

4. A process as claimed in claim 1, wherein the catalyst additionally contains from 1 to 5% by weight of iron oxides.

5. A process as claimed in claim 1, wherein the MgO support of the catalyst consists of spheres having a diameter of from 14 to 20 mm.

6. A process as claimed in claim 1, wherein the reaction temperature for the catalytic decomposition of ammonia and hydrogen cyanide is from 1000 to 1400° C.

7. A process as claimed in claim 1, wherein the reaction pressure for the catalytic decomposition of ammonia and hydrogen cyanide is from 1 to 3 bar.

8. A supported metal oxide catalyst which is free of noble metals and useful in a process for the decomposition of ammonia and hydrogen cyanide in sulfur-containing coke-oven gas, wherein the catalyst consists essentially of from 2 to 5.5% by weight of NiO and from 0.5 to 3.5% by weight of CoO, based on the total catalyst on a MgO support, and wherein the catalyst is prepared by impregnating the support with a nitrate, carbonate or oxalate solution of the corresponding metal and subsequently calcined by heating the impregnated support first from 30 to 60 minutes at from 300 to 400° C. and subsequently for the same time at from 600 to 700° C.

9. A catalyst as claimed in claim 8, containing from 3.5 to 4.5% by weight of NiO and from 1.5 to 2.5% by weight of CoO.

10. A catalyst as claimed in claim 8, containing from 82 to 97.5% by weight of MgO.

11. A catalyst as claimed in claim 8, which additionally contains from 1 to 5% by weight of iron oxides.

12. A catalyst as claimed in claim 8, wherein the MgO support consists of spheres having a diameter of from 14 to 20 nm.

* * * * *